G. H. SAUTIER.
AUTOMATIC RELEASE VALVE.
APPLICATION FILED FEB. 20, 1920.
1,369,052.
Patented Feb. 22, 1921.
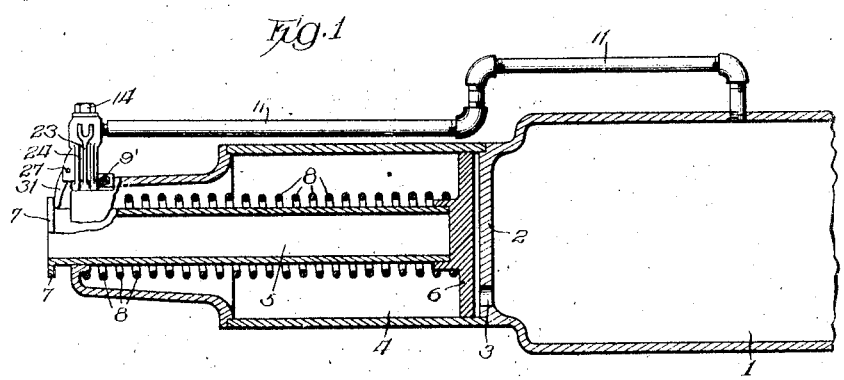
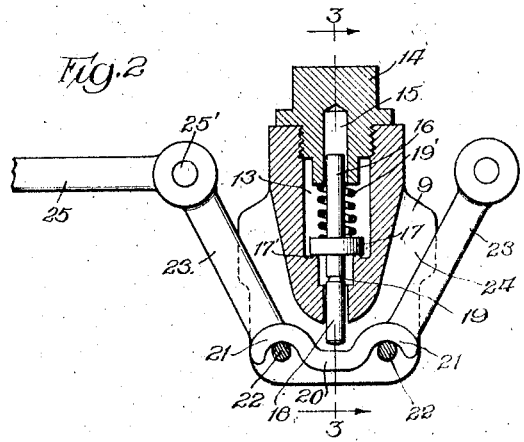
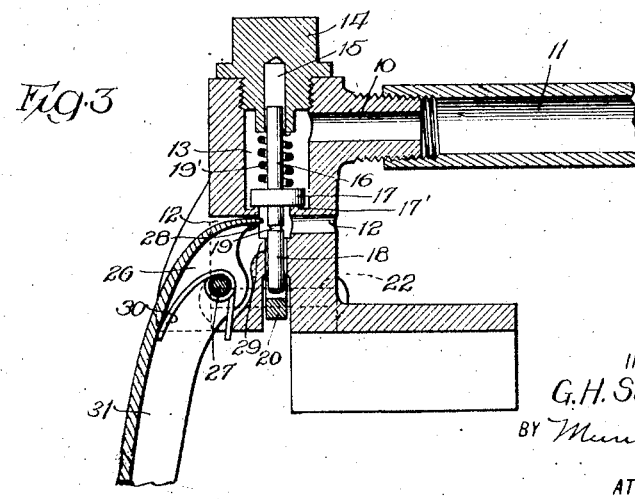
INVENTOR
G. H. Sautier
BY Munn & Co
ATTORNEYS

UNITED STATES PATENT OFFICE.

GEORGE H. SAUTIER, OF CHICAGO, ILLINOIS.

AUTOMATIC RELEASE-VALVE.

1,369,052.

Specification of Letters Patent.  Patented Feb. 22, 1921.

Application filed February 20, 1920. Serial No. 360,086.

*To all whom it may concern:*

Be it known that I, GEORGE H. SAUTIER, a citizen of the United States, and a resident of the city of Chicago, in the county of Cook and State of Illinois, have invented a new and useful Improvement in Automatic Release-Valves, of which the following is a full, clear, and exact description.

My invention relates to improvements in automatic release valves for air brake equipment, and it consists in the combinations, constructions and arrangements herein described and claimed.

An object of my invention is to provide an automatic release valve adapted to be connected to an auxiliary reservoir in an air brake equipment of standard type which will be automatically closed when the air in the auxiliary reservoir has been exhausted.

A further object of my invention is to provide a device of the type described that will normally remain closed, thus preventing the escape of air.

Other objects and advantages will appear in the following specification, and the novel features of the invention will be particularly pointed out in the appended claims.

My invention is illustrated in the accompanying drawings, forming part of this application, in which—

Figure 1 is a sectional view of the device as applied.

Fig. 2 is an enlarged sectional view of the device, and

Fig. 3 is an enlarged sectional view along the line 3—3 of Fig. 2.

In actual practice, it is necessary, in order to operate a release valve such as now used in connection with standard air brake equipment, to open the release valve and to manually hold the same open until the air has been exhausted from the auxiliary reservoir in the air brake equipment. When my device is applied, a workman opens the release valve in the air brake equipment of one car and then proceeds to the next car. The valve will be closed automatically when the auxiliary reservoir has been emptied. It will be obvious that a great saving in time and labor results.

In carrying out my invention, I make use of an auxiliary reservoir 1 having a head 2 in which is provided a communicating opening 3 into a car brake cylinder 4. A piston 5, having a piston head 6 secured thereto, is disposed within the cylinder 4 for reciprocation therein. It will be noted that the piston head 6 is connected to the end of the piston 5 adjacent to the auxiliary reservoir 1, and that the piston head 6 fits the car brake cylinder 4 snugly. An annular flange 7 is provided at the opposite end of the piston 5. The piston head 6 is normally held against the head 2 of the auxiliary reservoir 1 by the thrust of a spring 8 which is carried by the piston 5.

So far the parts described are of standard construction, and form no part of my invention, except in so far as they coöperate with the parts about to be described.

I provide a release valve having a body portion 9 which is mounted upon the end of the car brake cylinder 4 and may be secured in any approved manner, as at 9'. The body portion 9 has an air inlet 10 which is connected to the auxiliary reservoir 1 by means of an air pipe 11. Outlets 12 are provided in the body portion 9 which has a central bore 13. A cap 14 having a central recess 15 is screwed into the upper end of the central bore 13. A stem 16 is vertically disposed in the central bore 13, its upper end projecting within the central recess 15 of the cap 14. The stem 16 is secured to a disk 17 which seats against an annular shoulder 17' provided in the central bore 13. A portion 18 of the stem 16 depends from the disk 17 and is provided with an annular notch 19 at a spaced distance from the lower end. The disk 17 is normally kept seated against the shoulder 17' by the action of a spring 19' disposed about the stem 16.

A bar 20 having its ends bent upwardly and then downwardly to form sockets 21 is loosely disposed in the body portion 9, as clearly shown in Fig. 2 of the accompanying drawings. The sockets 21 are adapted to receive pins 22 which are carried upon the ends of levers 23 which are inserted through diametrically opposed lateral apertures 24 in the body portion 9. A rod 25 is pivotally connected at 25' to one of the levers 23.

A pawl 26 is pivotally secured at 27 to the body portion 9 at a point intermediate between the levers 23, and has a finger 28 projecting through an aperture 29. A spring 30 exerts a tension to force the finger 28 toward the lower portion 18 of the stem 16. The pawl 26 has an arm 31 projecting downwardly and kept in contact with the flange 7 upon the end of the piston 5 by the action of the spring 30. The finger 28 is adapted to engage the notch 19 in the lower portion 18 of the stem 16 when the disk 17 has been raised in the manner about to be described.

From the foregoing description of the various parts of the device, the operation thereof may be readily understood. A workman grasps the arm 25 and jerks the same outwardly, thus forcing the bar 20 upwardly against the lower portion 18 of the stem 16 and opening the valve. The finger 28 of the pawl 26 is inserted in the notch 19 of the lower portion 18 of the stem 16 and holds the stem in its raised position, so that the air may flow freely through the outlets 12. It is to be understood that the piston 5 has been kept in a protracted position prior to the opening of the release valve by the pressure of the compressed air against the piston head 6. When the air in the auxiliary reservoir has been exhausted, the pressure against the piston head 6 is removed, and the thrust of the spring 8 forces the piston head backwardly toward the auxiliary reservoir 1. The flange 7 in its retractive movement catches the arm 31 of the pawl 26 and pushes the same toward the cylinder 4, thus withdrawing the finger 28 from the notch 19 and permitting the valve to be closed by the action of the spring 19' pressing the disk 17 against the annular shoulder 17'.

It will be readily apparent that my improved device has many advantages over the release valves now in use, since it is no longer necessary for the workman to hold the valve opened while the air is being exhausted from the auxiliary reservoir, and a great saving in time and labor results, without an increase in the cost of equipment.

I claim:

1. In an air brake system for railroad cars, an auxiliary reservoir for compressed air, a car brake cylinder communicating therewith and having a piston, said piston normally being held in protracted condition by the pressure of air from said auxiliary reservoir when the brakes are applied, a release valve for said auxiliary reservoir, said release valve being mounted upon the remote end of said car brake cylinder, an air pipe connecting said auxiliary reservoir and an air inlet in said release valve, means for opening said release valve to permit the escape of air from said auxiliary reservoir, a pawl pivotally secured to said release valve and having a finger adapted to be inserted in a notch in a stem of said release valve, whereby the latter is maintained in opened condition, means operated when said reservoir has been emptied for closing said release valve, said last named means comprising a spring disposed upon said piston to cause a retractive movement of the same, and an annular flange carried at the end of said piston, said flange being arranged to engage said pawl when the piston is retractively moved, whereby the finger of said pawl is removed from the notch in the stem of said release valve, thereby permitting the latter to close.

2. In a device of the class described, a reservoir for compressed air, a release valve for said reservoir, an air pipe connecting the reservoir and an air inlet in said release valve, means for opening said release valve to permit the escape of air from said valve to permit the escape of air from said reservoir, a pawl pivotally secured to said release valve and having a finger adapted to be inserted in a notch in the stem of said release valve to maintain the latter in opened condition, and means operated when said reservoir has been emptied for closing said release valve.

GEORGE H. SAUTIER.